United States Patent Office 3,491,421
Patented Jan. 27, 1970

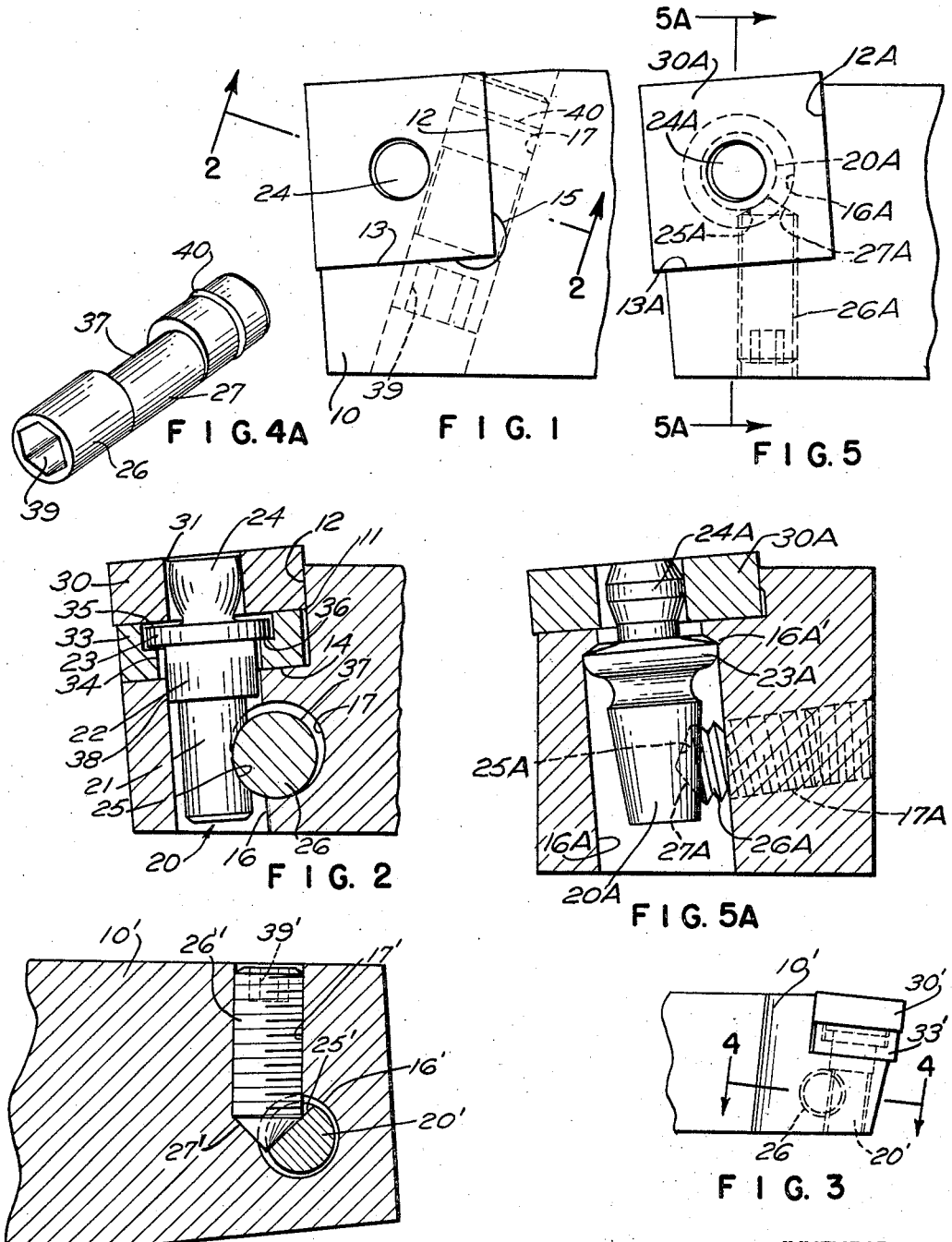

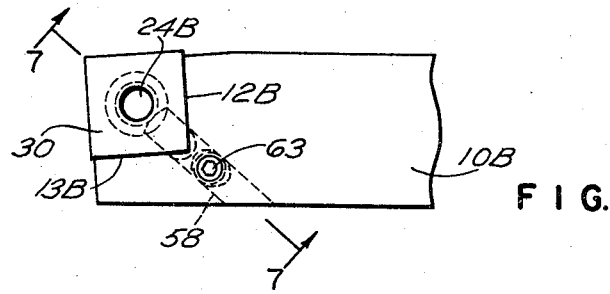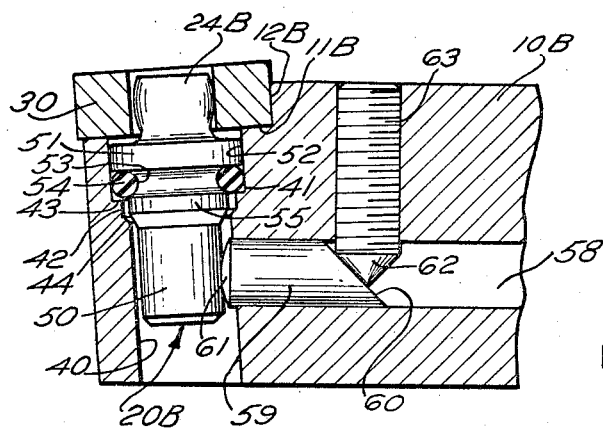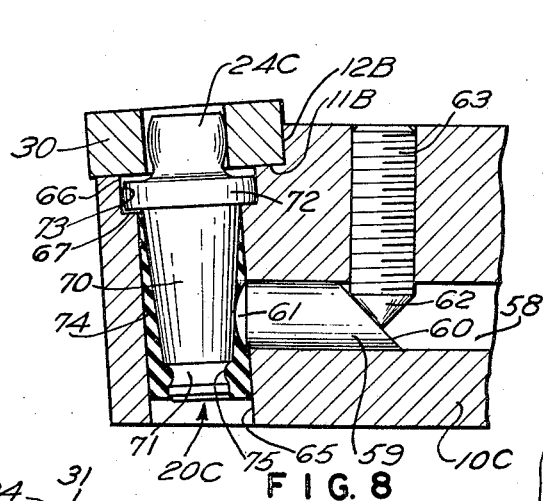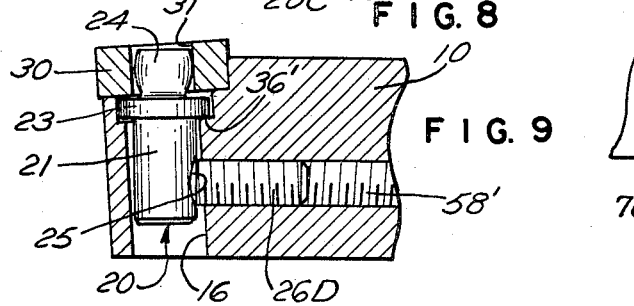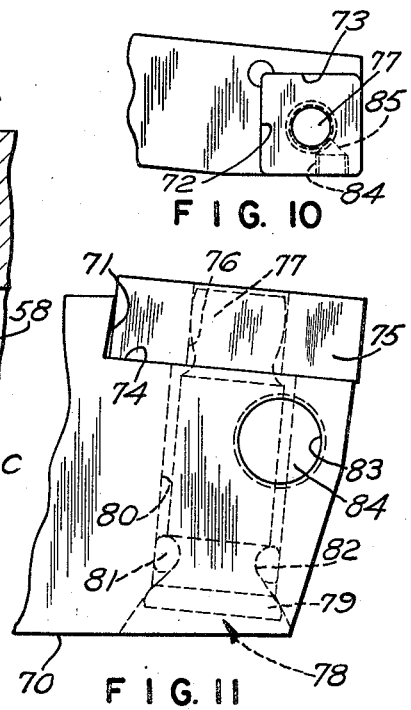

3,491,421
TOOL HOLDER FOR THROW-AWAY INSERTS
William S. Holloway, Cumberland Hill, R.I., assignor to Madison Industries, Inc., a corporation of Rhode Island
Continuation-in-part of application Ser. No. 481,852, Aug. 23, 1965. This application Dec. 27, 1967, Ser. No. 693,819
Int. Cl. B26d 1/00
U.S. Cl. 29—96                                                    7 Claims

ABSTRACT OF THE DISCLOSURE

A tool holder having a pocket for the insertion of a throw-away cutting insert which contains a hole, a wobble pin enters the hole in the insert and is rocked to firmly bind the cutting insert in the pocket.

CROSS REFERENCE TO RELATED APPLICATION

This application is a continuation-in-part of application Ser. No. 481,852, filed Aug. 23, 1965, now abandoned.

BACKGROUND OF THE INVENTION

Tool holders that are commonly used in the trade for throw-away insert cutters include a pocket for the reception of the cutting insert, which pocket is formed in the body of the tool holder. It is usual to hold the insert cutter by a clamp and chip breaker, but difficulty is experienced in retaining the insert cutter firmly within the pocket so that it abuts the vertical walls thereof. It is also important that the insert be held against the floor of the pocket, and thus a downward force must be exerted as well as a force into the juncture corner of the two vertical walls of the pocket.

SUMMARY

The tool holder provides an improved means of holding an insert into a tool holder so that the insert may be repositioned to a new cutting face thereof without disturbing the size adjustment or relative position of the tool holder with reference to the work.

DESCRIPTION OF THE DRAWINGS

FIG. 1 is a plan view showing an insert installed in a pocket provided in a tool holder;
FIG. 2 is a sectional view taken on lines 2—2 of FIG. 1;
FIG. 3 is an end elevational view of a modified form of the invention;
FIG. 4 is a sectional view taken on lines 4—4 of FIG. 3;
FIG. 4A is a perspective view of the cam pin;
FIG. 5 is a plan view of a modified form;
FIG. 5A is an enlarged sectional view taken on line 5A—5A of FIG. 5;
FIG. 6 is a plan view similar to FIG. 1 but showing a modified form of securing means;
FIG. 7 is an enlarged sectional view substantially on line 7—7 of FIG. 6;
FIG. 8 is a view similar to FIG. 7 but of a still further modified form of securing device;
FIG. 9 is a view of another form of securing device taken on a section line similar to line 7—7 of FIG. 6;
FIG. 10 is a plan view of a modified form; and
FIG. 11 is an enlarged elevational view of the modified form of FIG. 10.

DESCRIPTION OF THE PREFERRED EMBODIMENTS

Referring to the drawings, there is provided a tool holder having a body 10 which at one end thereof is formed with a recess or pocket generally indicated 11, which recess is preferably formed at an inclination to the general extent of the tool holder. This recess 11 is formed at one corner of the tool holder 10 such that a pair of vertical side walls 12 and 13 are provided as well as a bottom wall or floor 14. The side walls 12 and 13 extend at right angles to each other and to the floor 14, and for convenience in machining relief is provided as at 15 at the juncture of walls 12, 13 and 14. Extending through the tool holder from the floor of the recess is a bore 16, the axis of this bore being at right angles to the floor 14 of the recess. A second bore 17 extends on an axis normal to the bore 16 and intersects a portion thereof. Within the bore 16 is a wobble pin 20 which has a shank portion 21 that is very loosely fitted within the bore, an enlarged boss 22 that is loosely fitted within the bore, a flange 23 at the end of boss 22 with a lesser diameter upper end 24 which may be of bulging shape. The shank 21 is scalloped as at 25 to receive a cam pin 26 that is fitted within the bore 17. The cam pin 26 is provided with an eccentric cylindrical portion 27, the axis of which is offset from the end portions of the axis of the pin 26. The portion 27 engages the scalloped portion 25 of the wobble pin 20 and, as will be appreciated upon rotation of the cam pin 26, a force will be exerted against the pin 20 as the cam surface of the locking pin 26 is urged towards the pin 20.

The tool holder is intended for use with cutting inserts 30 which may be square, triangular or other shape, but which in all cases have a hole 31 therethrough on an axis substantially perpendicular to the upper and lower faces of the insert 30. The cutting insert 30 is shown as resting on a shim 33 which is bored as at 34 to freely receive the enlarged boss 22 of the locking pin and which is counterbored as at 35 to provide a shelf or shoulder 36 upon which the flange 23 of the locking pin may rest. With the cam pin 26 rotated so that the surface as at 37 is facing the scalloped groove 25, it will be apparent that the wobble pin 20 is free to move within the bore 16. The wobble pin 20 is however retained in the bore 16 by partial engagement with the cam pin 26 and the shim 33 is held in position by the flange 23. The cutting insert 30 is however free to be lifted off the upper portion 24 of the locking pin and replaced or rotated as is desired. Clamping of the cutting insert is achieved by rotation of the cam pin 26 such that the engagement within the scalloped portion 25 will tend to rock the wobble pin 20 clockwise as viewed in FIG. 2 about a pivot formed between the flange 23 and the shelf 36 of the shim 33. As will be apparent from examining FIG. 2, the rocking force will tend to urge the cutter toward the juncture of vertical walls 12 and 13 and additionally against the upper surface of the shim 33 by virtue of a downward force created by the rocking action of the pin 20. The boss 22 engages bore 16 as at 38 as the pin 20 is rocked and serves to position the pin in bore 16 and shifts the fulcrum point to this point of contact at 38. Rotation of the cam pin 26 is effected by any suitable means such as a hexagonal aperture 39 and held in frictionally locked position by an expansion ring 40, such as an O-ring. It should be pointed out that the dimensions of the upper end of the wobble pin 20 at 14 is such that a sliding fit into the hole 31 may be obtained insuring that a line contact with the bore 31 of the cutter insert will be made.

Referring now to FIGS. 3 and 4 of the drawing, an alternate form is shown like parts bearing like reference numerals with the prime affixed thereto. Here, however, the bore 17' is a threaded bore and is fitted with a screw 26' with a conical tip 27' that bears against the scalloped portion 25' of the wobble pin 20'. It should be noted that the axis of the bore 17' while normal to the bore 16' is also arranged at an attitude radially thereof such that when the conical end 27' of the screw 26' bears against the scalloped portion 25' of the wobble pin 20', it will rock the pin 20' in a plane that will substantially pass through the juncture between the walls 12 and 13. This radial attitude may thus vary as such parameters as the included angle of end 27' vary. It will be appreciated that the alternate form achieves an equivalent rocking action of the pin 20' through the movement of another actuator and it will therefore be further appreciated that with the two embodiments described, ease of changing the attitude of the cutting insert is achieved together with positive duplication of cutter position every time the cutting insert is changed.

Referring to FIGURES 5 and 5A of the drawing, an alternate form is shown like parts bearing like reference numerals with the letter A affixed thereto. It should be first noted that the bore 16A is provided with a shoulder as at 16A' and the second bore 17A is a threaded bore fitted with a screw 26A that has a conical tip 27A that bears against the tapered portion of the pin 20A as at 25A. The wobble pin 20A is similar to the wobble pin previously illustrated and described having a flange portion 23A and a bulging upper end 24A. It should be noted in this particular embodiment that as the end of the screw 26A bears against the pin 20A as at 25A it will tend to move the pin upwardly and rock the pin 20A in a clockwise direction as viewed in the drawing with the flange 23A rocking about the shoulder 16A so that the bulging end 24A will urge the cutter 30A toward the juncture of the vertical walls 12A and 13A of the recess formed for the cutter body and also the point of contact will be such as to create a downward force to assist in seating the cutter 30A into its socket or recess.

Referring now to FIGURES 6 and 7, a further alternate form of wobble pin is shown designated generally 20B for holding the cutting insert 30 in a slightly modified form of tool holder 10B with a recess 11B having meeting walls 12B and 13B. The tool holder 10B has a bore 40 with a larger bore 41 at its end adjacent the insert 30, while an intermediate bore 41 provides a shoulder 43 between it and the bore 41 and a bevel shoulder 44 between it and the bore 40.

The wobble pin 20B has a cylindrical shank portion 50 loosely fitted in the bore 40 and a flange 51 with arcuate edges 52 rockably mounted in the larger portion of the bore 41. Beneath this flange there is a circular groove 53 which receives an O-ring 54 engaging the bore 41 under some compression so as to hold the pin in the bore when no pressure is on it. Beneath this groove there is a portion 55 joining the cylindrical portion 50 and the groove portion 51 which is also loosely mounted in the bore 42 and its bevel connection 44 to the bore 40. A portion 24B extends above the flange to enter the opening in the insert which is to be held.

Intersecting the bore 40 there is a bore 58 through the tool holder in which there is a push rod 59 having a bevel surface 60 and with a rounded end 61 engaging the shank portion 50 of the pin so that when a tapered end 62 of a screw 63 is moved downwardly, this push rod 59 will be forced inwardly to rock the pin 20B toward the juncture of the surfaces 12A and 13A to hold the insert securely in the tool holder. It will, of course, be apparent that the resilient O-ring 54 will be compressed to allow this rocking movement.

Referring to FIGURE 8, the tool holder 10C is provided with a bore 65 enlarged as at 66 where it joins the recess 11B for the tool 30 providing a shoulder at 67 between the two bores. In this case the wobble pin designated generally 20C is of a further modified construction in which the lower shank portion is tapered as at 70 with an inwardly arched groove 71 adjacent this lower end. A flange 72 is provided between the tapered shank and the portion of the pin 24C which extends into the opening in the insert. This flange 72 is arched on its edge as at 73 so as to be rockably mounted in the enlarged portion 66 of the tool holder. In this case in order to hold the wobble pin in position, silicone rubber 74, which may be provided in liquid form, is used to fill the recess or space provided between the tapered portion 70 of the pin and the bore 65 which upon standing becomes hard enough to solidify. It is of a character which will adhere to a metal surface and thus will be retained in position in the bore 65 with the inwardly protruding portion 75 extending into the groove 71 in the pin so as to retain it in position. However, the pin may be greased or in some way lubricated so that it may be pulled from out of the silicone rubber jacket if it is desired to remove it due to the flexing of the portion entering groove 75 and then a new pin may be inserted or the old pin may be replaced by merely forcing it into position, the silicone rubber retaining itself in the bore 65 for this purpose. The silicone rubber is also sufficiently compressible so that the screw and push rod described above, which has corresponding numerals in this figure, will rock the wobble pin with one portion of its flange 72 engaging flange 67.

Referring to FIG. 9, pin 20 is received in the bore 16 which is counterbored to provide a shelf 36' upon which the flange 23 of the pin may rest. A cutting insert 30 is received in similar fashion to the previous embodiments in a recess, the upper portion 24 of the pin being loosely received in the hole 31. The bore 58' which intersects the bore 16, is threaded and a locking screw 26D is received therein which screw bears against the scalloped groove 25. The operation of this modification is identical to the previous arrangements, a rocking force being exerted by the screw 26D, pivoting of pin 20 taking place at flange 23 and shelf 36', while the diametrically opposite side of the flange contacts and is guided by the walls of the counterbore.

Referring now to FIGS. 10 and 11 of the drawing, a further alternate form of the invention is shown in which the same concept of a rocking action of a pin so as to force a carbide cutter tip into a recess or seat or shelf is illustrated. In this form of the invention the tool holder body 70 is formed at one end thereof with a recess or pocket 71 in such a way that two vertical or side walls 72 and 73 are provided as well as a bottom wall 74 into which a carbide cutter 75 may be received. The carbide cutter or cutting insert, as it is sometimes known, is provided with a hole 76 through the central portion thereof and into this bore a bulging end 77 of a wobble pin 78 is received. The pin 78 is provided at the opposite end thereof with an enlarged portion 79 which in effect provides a radial flange in the same fashion that the enlarged portions of the previous embodiments have done. This pin is received in the bore 80 of the tool holder 70 and may be held therein by an elastomeric ring such as is known as an O-ring 81 that is seated in a circumferential groove 82 provided on the pin 78. A bore 83 partially intersects the bore 80, the bore 83 being threaded and adapted to receive a screw 84 having a conical end 85. One portion of the conical end 85 will engage a portion of the pin 78 and rock the pin about its enlarged portion 79 in a direction which substantially intersects the juncture between wall 72 or 73.

I claim:
1. A tool holder for use with a throw-away insert having a central hole therein, said tool holder comprising a body portion having a recess with a floor and two side walls, a bore means extending through the floor of said recess substantially normal to the plane thereof including two portions of different diameters providing a shoulder, a pin received within said bore, said pin having a straight line axis and an enlarged portion providing a radial flange, said pin loosely fitted within one of said bore portions with said flange loosely fitting within the other of said bore portions and against said shoulder, the upper end of said pin engageable in the hole of an insert and means engaging a lower portion of said pin to create rocking movement thereof about said flange at its point of engagement with said shoulder in a direction to clamp a cutting insert against the side walls of said recess.

2. A tool holder as in claim 1 in which the means for rocking the pin includes a cam means engaging the lower end of said pin.

3. A tool holder as in claim 1 in which said means for rocking the pin includes a screw by means of which force is exerted against the lower end of said pin.

4. A tool holder as in claim 1 in which means are provided to retain the pin from dropping out of said bore.

5. A tool holder as in claim 1 wherein resilient means embraces said pin and said rocking movement compresses said resilient means.

6. A tool holder as in claim 1 wherein the radial flange is located at the lower end of the pin below the engaging means for creating rocking movement.

7. A tool holder as in claim 1 wherein the radial flange is located adjacent the upper end of the pin.

References Cited

UNITED STATES PATENTS

| | | | |
|---|---|---|---|
| 1,838,520 | 12/1931 | Archer | 29—98 |
| 3,097,417 | 7/1963 | Hill | 29—96 |
| 3,137,059 | 6/1964 | Hertel | 29—96 |
| 3,173,191 | 3/1965 | Alexander | 29—96 |
| 3,238,600 | 3/1966 | Milewski | 29—96 |
| 3,289,272 | 12/1966 | Stier | 29—96 |

HARRISON L. HINSON, Primary Examiner